(12) United States Patent
Reis et al.

(10) Patent No.: US 11,734,780 B2
(45) Date of Patent: Aug. 22, 2023

(54) OPTIMALLY RANKING ACCOMMODATION LISTINGS BASED ON CONSTRAINTS

(71) Applicant: Airbnb, Inc., San Francisco, CA (US)

(72) Inventors: Joao Pedro Carvalho Oliveira de Miranda Reis, San Francisco, CA (US); Zhiyao Wang, San Francisco, CA (US); Heng Ji, Santa Clara, CA (US); Laetitia Kim Anh Perrine Jumel, New York, NY (US)

(73) Assignee: Airbnb, Inc., San Francisco, CA (US)

( * ) Notice: Subject to any disclaimer, the term of this patent is extended or adjusted under 35 U.S.C. 154(b) by 417 days.

(21) Appl. No.: 16/788,248

(22) Filed: Feb. 11, 2020

(65) Prior Publication Data

US 2021/0248696 A1 Aug. 12, 2021

(51) Int. Cl.

| | |
|---|---|
| *G06F 3/0482* | (2013.01) |
| *G06F 16/2457* | (2019.01) |
| *G06F 16/248* | (2019.01) |
| *G06F 16/335* | (2019.01) |
| *G06Q 50/14* | (2012.01) |
| *G06Q 10/02* | (2012.01) |
| *G06Q 30/0601* | (2023.01) |

(52) U.S. Cl.
CPC ........... *G06Q 50/14* (2013.01); *G06F 3/0482* (2013.01); *G06F 16/248* (2019.01); *G06F 16/24578* (2019.01); *G06F 16/335* (2019.01); *G06Q 10/02* (2013.01); *G06Q 30/0631* (2013.01)

(58) Field of Classification Search
CPC .... G06Q 50/14; G06Q 10/02; G06Q 30/0631; G06N 20/00; G06F 16/2228; G06F 16/29; G06F 3/0482; G06F 16/24578; G06F 16/248; G06F 16/335
See application file for complete search history.

(56) References Cited

U.S. PATENT DOCUMENTS

| | | | |
|---|---|---|---|
| 2014/0114705 A1* | 4/2014 | Bashvitz ............ | G06Q 10/1093 705/5 |
| 2014/0278591 A1* | 9/2014 | Blecharczyk .......... | G06Q 10/02 705/5 |
| 2015/0206258 A1* | 7/2015 | Charkov ................ | G06Q 50/14 705/26.64 |

(Continued)

*Primary Examiner* — Yuk Ting Choi
(74) *Attorney, Agent, or Firm* — Schwegman Lundberg & Woessner, P.A.

(57) ABSTRACT

A system and a method are disclosed for optimally ranking and indexing accommodation listing information based on a set of constraints corresponding to a travel activity goal input on a client device. In an embodiment, an accommodation management system receives a travel activity goal input by a guest user on a client device with a corresponding set of constraints. Based on the constraints, the accommodation management system determines a set of geographic coordinates corresponding to the travel activity, and further identifies the set of candidate accommodation listings with accommodations within a threshold distance from the geographic coordinates. The accommodation management system filters and ranks the candidate accommodation listings based on the constraints, and sends a recommendation to the guest user for display on the client device which includes one or more of the ranked accommodation listings.

18 Claims, 6 Drawing Sheets

(56) References Cited

U.S. PATENT DOCUMENTS

| | | | | |
|---|---|---|---|---|
| 2016/0117613 A1* | 4/2016 | Goldstein | ............ | G06Q 10/109 705/5 |
| 2016/0148237 A1* | 5/2016 | Ifrach | ................ | G06Q 30/0202 705/7.31 |
| 2017/0032286 A1* | 2/2017 | Vasupal | ................. | G06Q 30/08 707/999.003 |
| 2017/0048664 A1* | 2/2017 | Zhang | ..................... | H04W 4/21 707/999.003 |
| 2017/0148664 A1* | 5/2017 | Rupp | ................ | H01L 21/30625 707/999.003 |
| 2017/0149689 A1* | 5/2017 | Norman | ................ | H04L 67/306 707/999.003 |
| 2017/0357904 A1* | 12/2017 | Adler | .................... | G06Q 10/109 |
| 2018/0307753 A1* | 10/2018 | Guo | ........................ | G06F 16/61 707/999.003 |
| 2020/0258010 A1* | 8/2020 | Schlank | ............. | G06Q 10/1093 707/999.003 |
| 2021/0004770 A1* | 1/2021 | Bansal | ............... | G06Q 10/1095 707/999.003 |

* cited by examiner

Recommended Listings — Ranking Preference ▼

- ● Bus (default)
- Train
- Subway
- Taxi
- Recommended for You

1 Loft with City View
Entire Apartment • 3 Bed
3 beds • 1 bedroom • 1 bath
Wifi • Kitchen • Air conditioning
$100 / night
0.1 miles from Bus stop

2 Cozy Cabin
Entire Cabin • 8 Beds
2 beds • 1 bedroom • 1 bath
Wifi • Kitchen • Air conditioning • Hot tub
$150 / night
0.3 miles from Bus stop

3 Luxury Apartment
Private Room • 2 Beds
2 beds • 2 bedroom • 1 bath
Wifi • Kitchen • Washer
$75 / night
0.8 miles from Bus stop

*FIG. 3A*

Recommended Trips and Accommodations

Los Angeles - Lakers vs Clippers at Staples Arena
Dec. 13th

| 1 | Luxury Apartment<br>Private Room • 2 Beds<br>$150 / night<br>0.3 miles from Event |

| 2 | Modern House<br>Full House • 2 Beds<br>$125 / night<br>0.9 miles from Event |

San Francisco – Warriors vs Celtics at Chase Center
Jan. 1st

Sacramento – Kings vs Trailblazers at Golden 1 Center
Jan. 10th

San Francisco & Sacramento – Weekend Trip
Dec. 21st - Dec. 22nd

Warriors vs Thunder at Chase Center on Dec. 21st

| 1 | Spacious Loft<br>Private Room • 1 Bed<br>$145 / night<br>0.2 miles from Event |

Kings vs Rockets at Golden 1 Center on Dec. 22nd

| 1 | Cozy House<br>Full House • 2 Beds<br>$155 / night<br>0.7 miles from Event |

*FIG. 3B*

OPTIMALLY RANKING ACCOMMODATION LISTINGS BASED ON CONSTRAINTS

TECHNICAL FIELD

The disclosure generally relates to database systems, and more specifically relates to optimally ranking and indexing accommodation listing information based on a set of constraints.

BACKGROUND

Accommodation management systems provide mechanisms to guest users for booking stays at listed accommodations to stay at when travelling. Guest users may plan travel activity well in advance based on their travel activity goals and availability. For example, a guest user may desire to see five professional sports games in different cities over the next year during long (e.g. 3 day) weekends. However, accommodation management systems are not integrated with travel activity database systems as a means to facilitate booking accommodations that fulfill the travel activity goals of guest users. As such, in order to accomplish their travel activity goals, guest users must manually search for accommodation listings on accommodation management systems which are suitable for accessing their planned travel activity.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A illustrates one embodiment of a user interface for selecting a preferred criterion for ranking accommodation listings.

FIG. 3B illustrates one embodiment of a user interface for providing a recommendation to a guest user that includes groups of accommodation listings.

DETAILED DESCRIPTION

Figure 1:
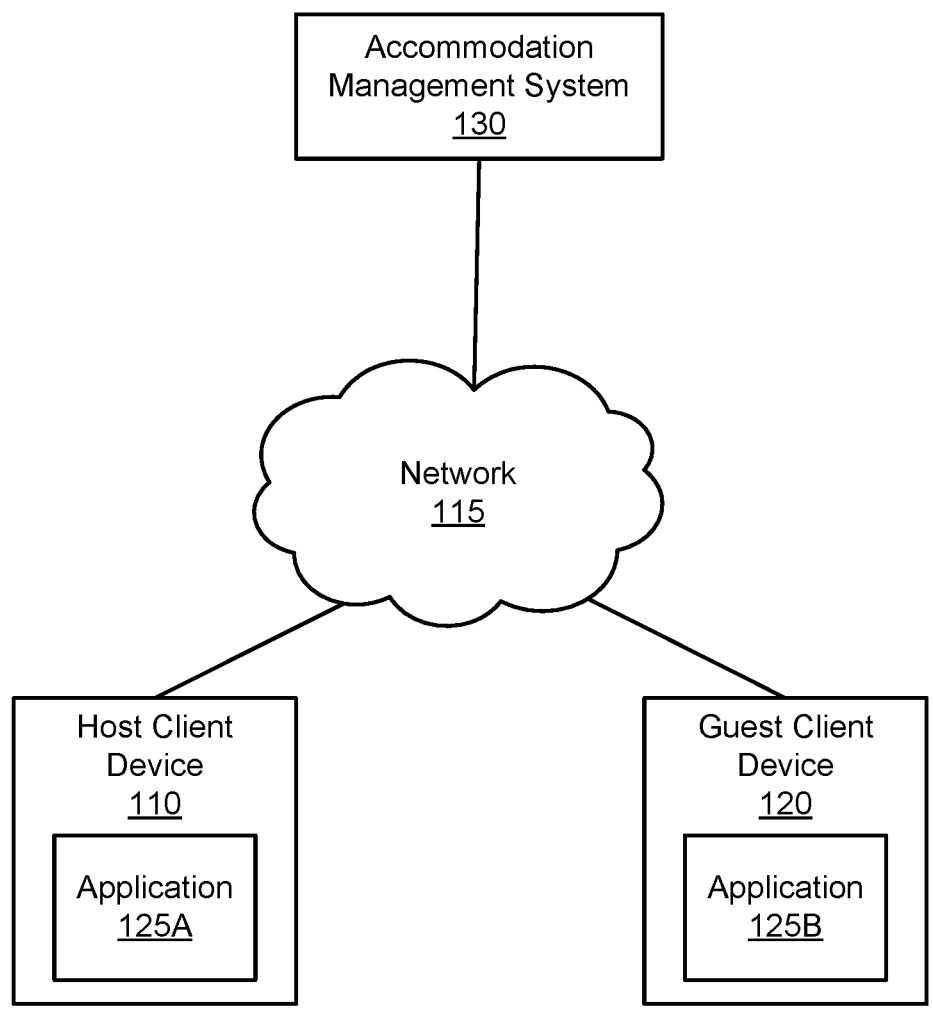
FIG. 1 illustrates one embodiment of a network environment for components of an accommodation management system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview.

One embodiment of a disclosed system, method and computer readable storage medium that includes recommending a set of accommodation listings to a guest user interested in experiencing a travel activity goal. For example, a guest user of an accommodation management system may desire to see professional baseball games at all 32 baseball parks in the United States of America before the end of next year, subject to certain constraints, such as only being able to take twenty days off from work a year. To facilitate this travel activity goal, the accommodation management system determines a set of optimal accommodation listings which the guest user might stay at when travelling to see baseball games at each of the 32 parks. Furthermore, the accommodation management system provides a recommendation to the guest user to stay at one or more of the determined accommodation listings in order to accomplish the travel activity goal.

In particular, the accommodation management system recommends accommodation listings to the guest user which satisfy a set of constraints corresponding to a travel activity goal input by the guest user through a client device. An accommodation management system receives a travel activity goal as input from the guest user that specifies a travel activity occurring in one or more geographic regions (e.g. seeing a professional sports game or visiting a particular tourist attraction). The accommodation management system determines the constraints corresponding to the travel activity goal based on the input, which include an identifier of the travel activity (e.g. the name and/or location of the travel activity), an end time for accomplishing the travel activity goal (e.g. one year from the current time), and times during which the guest user is available for accomplishing the travel activity goal (e.g. the month of June). The accommodation management system determines a set of accommodation listings which are located in the one or more geographic regions and filters the accommodation listings using the constraints and a booking availability of each accommodation listing. Responsive to filtering the accommodation listings, the accommodation management system sends a recommendation to the guest user for accomplishing their travel activity goal including one or more of the filtered accommodation listings.

In an embodiment, the accommodation management system ranks the filtered accommodation listings and includes the one or more accommodation listings in the recommendation based on the ranking. The accommodation management system may rank the filtered accommodation listings based on a transportation mode for accessing the activity (e.g. by bus, by taxi, by train, etc.), a geographic position of the accommodation listings, and a booking availability of the accommodation listings.

Accommodation Management System Environment

Figure (FIG. 1 illustrates one embodiment of a network environment for components of an accommodation management system. Environment 100 includes host client device 110, network 115, guest client device 120, and accommodation management system 130. Though only one of each type (i.e., host or guest) of client device 110 is shown in FIG. 1, other embodiments may use more than one client device of either type. While not depicted, additional client devices may be included in environment 100 and may be used by service providers, such as third-party entities. These various components are now described in additional detail.

Host client device 110 is a client device of a host user of accommodation management system 130. The term host, as used herein, refers to a user of accommodation management system 130 that lists one or more accommodations on accommodation management system 130. The term guest, as used herein, refers to a user of accommodation management system 130 that books a listed accommodation. Users of accommodation management system 130 can be a host user, a guest, or both. The term client device, whether used with reference to a host, a guest, or a third-party entity, refers to a computing device such as a smart phone, laptop, computer, or any other device that can interact with accommodation management system 130 over network 115 consistent with the interactions described herein.

Host client device 110 includes an application 125A, and a guest client device 120 includes an application 125B. The term application, when used in connection with accommodation management system 130, whether used in reference to a host user, a guest user, or a third-party user, refers to an application capable of carrying out actions relating to use of accommodation management system 130 that are described herein. Examples of such actions include outputting listings for display, completing a booking of a listed accommodation, outputting notifications to a host or a guest, completing a check-in or check-out process, commanding an entry to an accommodation to unlock, and the like. In some embodiments, each of the client devices includes one or more instances of an application 125 associated with accommodation management system 130. Any number of client devices may be included in environment 100; the depiction of only one of each of host client device 110 and guest client device 120 is merely for convenience.

Network 115 may be any suitable communications network for data transmission. In an embodiment such as that illustrated in FIG. 1, network 115 uses standard communications technologies and/or protocols and can include the Internet. In another embodiment, the entities use custom and/or dedicated data communications technologies. Network 115 connects host client device 110, guest client device 120 (or client devices, in other embodiments), and any other client device, to accommodation management system 130 such that the host client device 110, guest client device, and accommodation management system 130 can transmit data back and forth.

Accommodation management system 130 facilitates activity relating to listing, booking, and physically accessing an accommodation. Further details relating to such activities are described throughout with reference to FIGS. 2-5 below.

Accommodation Management System Configuration

Figure 2:
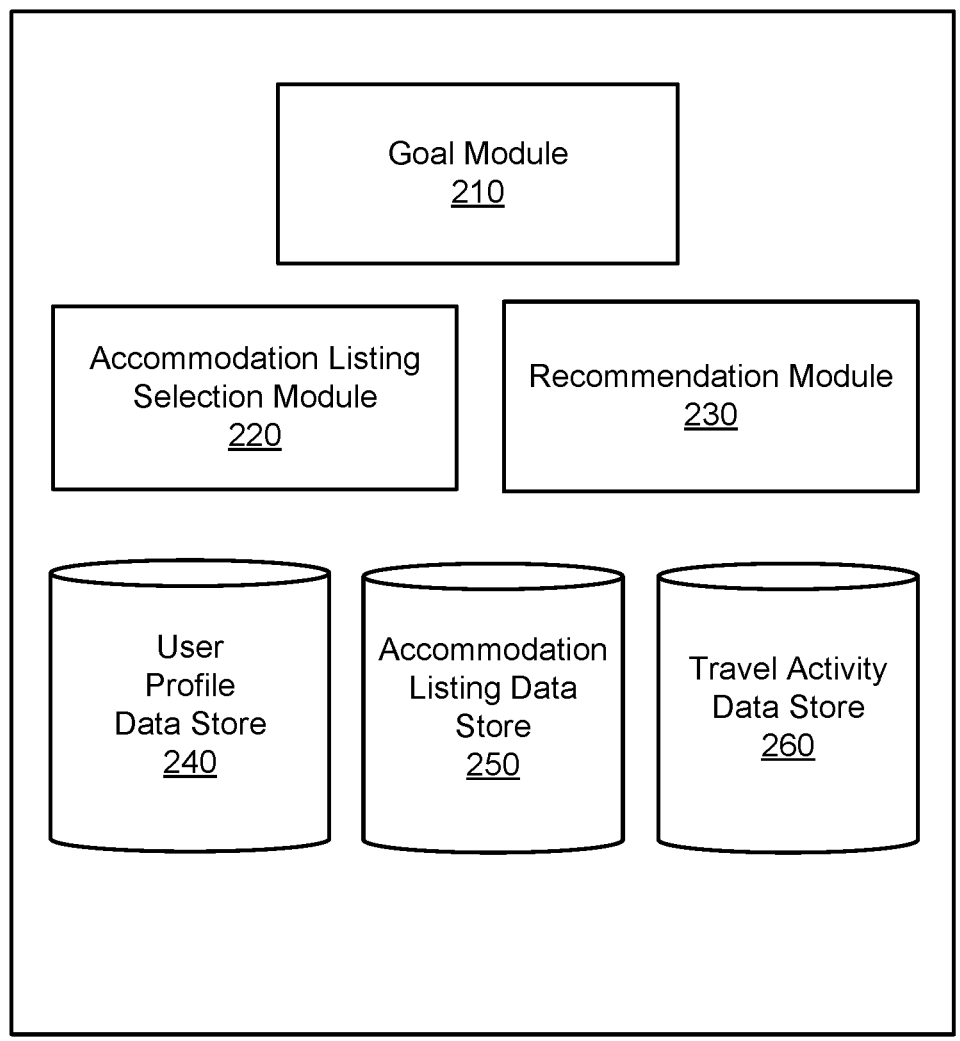
FIG. 2 illustrates one embodiment of modules and databases used by an accommodation management system.

FIG. 2 illustrates one embodiment of modules and databases used by an accommodation management system. Accommodation management system 130 includes goal module 210, accommodation listing selection module 220, and recommendation module 230. Accommodation management system 130 also includes user profile data store 240, accommodation listing data store 250, and travel activity data store 260. The modules and databases depicted with respect to accommodation management system 130 are merely exemplary; fewer or more modules or databases may be used to affect the processes described herein.

Goal module 210 receives and processes a travel activity goal associated with a guest user of accommodation management system 130. Accommodation management system 130 stores a user profile associated with the guest user in user profile data store 240, the user profile including relevant information describing the guest user and the guest user's activity on the accommodation management system. For example, a user profile may include the guest user's name, location, accommodation listing booking history, and search history on the accommodation management system. The term travel activity, as used herein, refers to an activity which a guest user can experience at one or more locations on one or more dates. For example, a travel activity might be the guest user visiting a specific tourist attraction or location (e.g. the Roman Coliseum or Paris, France). As another example, a travel activity might be an activity that the guest user can experience in several locations in various contexts (e.g. a professional sporting competition). Additionally, a travel activity may only specify locations the guest user may visit (e.g. traveling in Spain, visiting Paris, etc.).

Accommodation management system 130 stores data associated with travel activities in travel activity data store 260. The data associated with a travel activity may include an activity identifier, a description of the activity, one or more geographic regions associated with the activity, and one or more activities related to the activity. The travel activity goal provides a description of a travel activity which the guest user desires to experience. For example, a guest user's travel activity goal may be visiting all 32 baseball stadiums in the United States of America over the next year. The travel activity goal may be input by the guest user (e.g. by interacting with Application 125B) and received by goal module 210 from a client device (e.g. guest client device 120). Based on the input travel activity goal, goal module 210 may determine a set of constraints corresponding to the guest user's availability for experiencing the relevant travel activity. The term constraint, as used herein, refers to a limitation imposed on the manner in which the guest user can experience the travel activity goal. In particular, goal module 210 may process the input travel activity goal to determine the activity identifier (i.e. an activity constraint), an end time for the guest user to experience the activity (i.e. an end time constraint), and indicia of a subset of time between the present time and the end time during which the guest user is available to experience the travel activity (i.e. availability constraints). Each constraint has a constraint type which defines the type of information the constraint conveys (e.g. an activity, an end date, or guest user availability). The term present time, as used herein, refers to the time at which the accommodation management system 130 receives the travel activity goal. The indicia of a subset of time may include several time ranges during which the guest user is available, each time range including a start date and a time length. The indicia of a subset of time may alternatively specify time ranges during which the guest user is unavailable, and the techniques and methods discussed herein can be adapted to accommodate this scenario. Goal module 210 may additionally determine the constraints based on the guest user's user profile and data associated with the travel activity stored in the travel activity data store 260, which is described in greater detail below in the section titled "determining travel activity goal constraints."

In an embodiment, goal module 210 periodically updates the data describing travel activities stored in travel activity data store 260. In this case, goal module 210 may access information related to the travel activities on one or more third-party system. For example, goal module 210 may access data describing a game schedule for an upcoming season of a professional sport, which includes the location, date, and teams for each game. Goal module 210 may access this information from third-party systems using one or more application programming interfaces (APIs) or scraping the data from relevant websites. In another embodiment, goal module 210 accesses and updates data in activity data store 260 in responsive to receiving the travel activity goal.

In an embodiment, goal module 210 receives the travel activity goal as text input provided by the guest user, such as one or more sentences describing the travel activity goal. In this case, goal module 210 may use natural language processing (NLP) techniques to determine the constraints based on the text input, such as using a machine learned NLP model. For example, the guest user may input the text "I want to see Paris and London over the next two months." The NLP model may receive this text as input and output activity identifiers corresponding to Paris and London, an end time corresponding to the end of the following two months, and indicia of a subset of time including all days over the next two months. As another example, the guest user may input the text "I want to see 10 weekend professional basketball games before the end of the year." The NLP model may receive this text as input and output an activity identifier corresponding to professional basketball, an end time corresponding to the end of the current year (e.g. 12:00 AM on December $31^{st}$ of the current year), and indicia of a subset of time including all weekdays during the current year (i.e. the user available on weekends). Accommodation management system 130 may provide indicators to the guest user as to what type of information the text input must include (e.g. on a text input interface displayed on a client device), such as requiring one or more activities and an end time. In the same or different embodiment, accommodation management system 130 provides an interactable input corresponding to each of the constraints, such as selecting from a set of travel activities, entering an explicit end time, and entering dates on which the guest user is available.

In an embodiment, goal module 210 determines the indicia of a subset of time during which the guest user is available based on calendar data associated with the guest user. The term calendar data, as used herein, refers to data describing the availability of a user of accommodation management system 130 on a set of dates. Calendar data may include information describing why a user will be unavailable at a particular time (e.g. a meeting, a phone call, a full work day, etc.). Goal module 210 may use the calendar data to determine dates on which the guest user is available for experiencing the relevant travel activity between the current date and the end time. Calendar data may be data stored on a third-party application installed on guest client device 120, such as a calendar application. In this case, goal module 210 may request the calendar data from the third-party application through an application associated with accommodation management system 130 (i.e. an accommodation management application) installed on the client device (e.g. application 125B) and receive the calendar data from the third-party application. In another example, the calendar data may be stored by accommodation management system 130 (e.g. in user profile data store 240). In this case, the calendar data may describe dates on which the guest user has booked accommodation listings (e.g. planned stays at accommodations) which are listed on accommodation management system 130. In the same or different embodiment, the guest user may provide availability constraints as part of the input travel activity goal.

Accommodation listing selection module 220 receives a set of constraints associated with a travel activity goal corresponding to a user and determines one or more accommodation listings in accommodation listing data store 250 which satisfy the constraints. Accommodation management system 130 stores data associated with each accommodation listing in accommodation listing data store 250. The data associated with an accommodation listing includes information about the listing such as a title, host user, address, previous guest users, and booking availability. Accommodation listing selection module 220 may determine one or more geographic coordinates (e.g. longitude-latitude positions) corresponding to geographic regions associated with the indicated travel activity. Accommodation listing selection module 220 may further identify accommodation listings stored in the accommodation listing data store 250 within a threshold distance or travel time (using one or more modes of transport) from the one or more geographic coordinates based on a geographic position of the accommodation listing (e.g. determined based on the accommodation listing's address). Accommodation listing selection module 220 may filter the identified accommodation listings based on the received constraints. For example, the accommodation listing selection module 220 may filter the identified accommodation listings based on the availability constraints.

In an embodiment, the data describing travel activities stored in activity data store 260 may include hierarchical relationships between travel activity categories (e.g. professional basketball games or Europe) and specific travel activities within the category which may occur on one or more dates (e.g. the Los Angeles Lakers vs the Golden State Warriors on Dec. 14, 2019 for professional basketball games or the Eiffel Tower for Europe). In this case, accommodation listing selection module 220 may receive constraints with an activity identifier associated with a travel activity category and identify a set of specific travel activities based on the category. For example, accommodation listing selection module 220 may determine a set of travel activities associated with the received activity identifier and identify geographic coordinates corresponding to each travel activity in the set of travel activities. As such, if the travel activity goal of the guest user was visiting all 32 professional baseball stadiums during the current year, accommodation listing selection module 220 would determine all travel activities related to professional baseball games during the current year (e.g., all baseball games occurring in each of the 32 parks).

Recommendation module 230 receives references to a set of accommodation listings and recommends one or more accommodation listings from the set of accommodation listings to a guest user for experiencing a travel activity goal. Additionally, recommendation module 230 may receive constraints corresponding to the travel activity goal. Recommendation module 230 may rank the set of accommodation listings based on various factors such as mode of transportation accessibility to the accommodation, mode of transportation accessibility to the travel activity from the accommodation, the number of dates the guest user is available to stay at the accommodation, etc. If recommendation module 230 receives an activity identifier corresponding to a set of travel activities, as described above in relation to goal module 210, recommendation module 230 may rank the accommodation listings based on which travel activity in the set of travel activities the accommodation listing corresponds to. Based on the ranking, recommendation module 230 may generate a recommendation including one or more of the accommodation listings. Furthermore, recommendation module 230 may send the recommendation for display on the guest user's client device (e.g. guest client device 120).

In an embodiment, recommendation module 230 determines the modes of transportation corresponding to each accommodation listing by accessing map data provided by a third-party system. For example, recommendation module 230 may access map data from a navigation application or system describing the roads between the accommodation and the activity (e.g. is there close highway access, are the roads paved or dirt, would a taxi be available to pick up or drop off a guest user at the activity location, etc.). As another example, recommendation module 230 may determine the distance from the accommodation to the nearest train station, bus stop, etc. using the accessed map data. Recommendation module 230 may determine a score for each of a set of transportation modes for the accommodation listing (e.g. an airplane score, a bus score, a train score, etc.), and compare these scores to a particular mode of transportation in order to determine a ranking for the accommodation listing. Recommendation module 230 may additionally include one or more modes of transportation in the recommendation based on the mode of transportation scores.

In an embodiment, recommendation module 230 determines one or more groups of accommodation listings from the set of accommodation listings based on the travel activity goal and ranks the one or more groups. Recommendation module 230 may group the accommodation listings based on a geographic position of the accommodation and the booking availability of the accommodation listings. For example, the travel activity goal corresponding to the user may require a weeklong trip. Although a single accommodation listing may not be available for an entire week, the recommendation module 230 may create a group of three accommodation listings which are geographically near each other and satisfy the constraints of the travel activity goal. Recommendation module 230 may further rank the one or more groups of accommodation listings based on various factors, such as convenience to the guest user, cost to book the accommodation listings, and quality of the accommodation listings. Recommendation module 230 may include all of the accommodation listings in a group in the recommendation to the guest user based on the ranking.

In the same or different embodiments as those discussed above, recommendation module 230 ranks the received set of accommodation listings based on accommodation preferences of the relevant guest user. In particular, recommendation module 230 may rank accommodation listings in the received set of accommodation listings more highly if information describing the accommodation listings (e.g. stored in accommodation listing data store 250) match one or more of the accommodation preferences of the guest user. Accommodation preferences may include any characteristic of an accommodation listing, such as location, amenities, and unit type. For example, accommodation preferences may indicate desired amenities such as hot tubs, couches, number of rooms, number of bathrooms, etc. As another example, location-based accommodation preferences may include distance to a nearby ocean, lake, tourist attraction, or other destination. In one embodiment, the guest user manually provides accommodation preferences through a user interface provided by accommodation management system 130. In particular, the guest user may provide accommodation preferences as part of a travel activity goal input by the guest user and received by goal module 210. In the same or different embodiment, recommendation module 230 determines the guest user's accommodation preferences based on the guest user's prior booking history.

Determining Travel Activity Goal Constraints

In various embodiments, goal module 210 receives travel activity goals in a variety of formats and processes the travel activity goals accordingly in order to extract a corresponding set of constraints. In an embodiment, goal module 210 provides the travel activity goal and the corresponding set of constraints to the accommodation listing selection module 220. In an embodiment, goal module 210 provides a prompt to guest users with one or more interactable fields for inputting explicit constraints (e.g. selecting from a list of activities, inputting an exact end time, providing exact date ranges of availability, etc.). In the same or different embodiments, goal module 210 uses an NLP machine learned model to determine the set of constraints (i.e. a constraints model), as described above in relation to goal module 210. In this case, goal module 210 may receive the travel activity goal in the form of text input (e.g. represented as a string) and input the text input into the constraints model. The text input may have been input directly by a guest user to accommodation management system 130 as a travel activity goal, or may have been determined based on textual data input by the guest user in other contexts (e.g. a blog post, a social media post, etc.).

The constraints model may be usable to identify one or more words in the text input corresponding to a constraint type (e.g. the activity identifier, the end time, etc.) for each constraint from the set of constraints and determine the constraints based on the identified words. As an exemplary case, if the text input is "I want to see all 32 baseball parks in the next year" the constraints model identifies the words "32 baseball parks" as corresponding to the activity constraint, and the words "next year" as corresponding to the end time constraint. Based on the identified words for each constraint, the constraints model may perform context analysis in order identify explicit constraints. For example, the constraints model may determine whether the words "next year" refer to the current year or the following year. As a further example, the constraints model may determine what baseball parks the user is referring to (e.g. professional parks, college parks, etc.)? Based on the results of the context analysis, the constraints model may determine explicit constraints. For example, the end time constraint may be 12:00 AM on December 31$^{st}$ of the current year and the activity identifier may correspond to scheduled baseball games at each of the 32 baseball stadiums in the United States of America. In additional examples the constraints model may determine the subset of time for guest user availability based on the text input and any additional constraints determined by goal module 210. The constraints model may be implemented using various known NLP techniques, and in particular using semantics-oriented methods. For example, the constrains model may be implements using semantics methods relating to sentiment analysis, topic segmentation, named entity recognition (NER), natural language understanding, question answering, relationship extraction, word sense disambiguation, and any combination thereof.

Goal module 210 may retrieve data describing user activity on accommodation management system 130 and use the data for performing contextual analysis with the constraints model. The term user activity, as used herein, refers to any interaction of a user with accommodation management system, such as booking accommodation listings, hosting accommodation listings, searching for accommodation listings, logging on to accommodation management system 130, etc. Accommodation management system may store data describing user activity in user profile data store 240, accommodation listing data store 250, or one or more additional data stores used for logging user activity. Goal module 210 may use retrieved user activity data to inform constraint selection when input based contextual analysis is insufficient. For example, if the input is "I want to see a basketball game in Washington," the constraints model may not be able to determine whether the user is referring to the State of Washington in the United States (e.g. a college basketball game at the University of Washington) or the capital of the United States, Washington D.C. (e.g. a professional basketball game featuring the Washington Wizards). As such, the constraints model may rely on user activity data to determine which location the user is referring to (a city in the state of Washington or Washington D.C.) as well as the particular game. If the user activity data indicates that the guest user has previously attended Washington Wizards games or lives in closer proximity to Washington D.C. than the state of Washington, then the constraints model may determine activity constraints corresponding to a Washington Wizards game.

Goal module 210 may train the constraints model using text inputs describing a travel activity goal which are labeled with ground truth constraints. For example, the training text entry "I want to see Paris this summer" would be labeled with an activity identifier corresponding to Paris, France, an end time corresponding to September $22^{nd}$ of the current year, and indicia of a subset of time between June $20^{th}$ of the current year and September $22^{nd}$ (e.g. the summer season). Goal module 210 may collect data for training the constraints model based on historical travel activity goal inputs. For example, goal module 210 may display constraints determined for a travel activity goal to a guest user and ask the guest user to confirm or update the constraints and then submit the final constrains before accommodation management system 130 generates a recommendation. The submitted final constraints may then be used to label the input travel activity goal with ground truth constraints and train the model.

Goal model 210 may determine the subset of time for user availability based on user calendar data. In this case, goal model 210 may use the calendar data in combination with a machine learned model to determine the guest user availability constraint (e.g. an availability model). The availability model 210 may be used to determine a score indicating whether a user is available on one or more dates based on the calendar data. For example, the calendar data may indicate that the guest user has a meeting scheduled on a particular date for a dial-in call meeting from 2 pm-3 pm. Although the guest user may be unavailable at this time on their calendar, this does not necessarily mean that the guest user cannot attend this meeting while traveling (i.e. is still available). As such, the availability model may determine a score for the date indicating a prediction that the guest user is still available on that date.

In an embodiment, goal module 210 inputs a guest user's calendar data to the availability model and receives a set of time ranges specifying one or more dates during which the guest user is available as output. Additionally, goal module 210 may input a subset of time for guest user availability to the availability model which was determined directly from the travel activity goal. The availability model may then consider both the calendar data and the explicit availability provided by the user in determining whether a user is available on a given date. For example, the guest user may provide input indicating a desire to travel on 3-day weekends, but the calendar data may indicate a particular 3-day weekend on which the guest user is not available. In this case, the availability model weighs both of these pieces of information when determining a score for the dates of the particular 3-day weekend.

Filtering Accommodation Listings

In various embodiments, accommodation listing selection module 220 selects a set of candidate accommodation listings that meet various criteria based a set of constraints corresponding to a travel activity goal. The term criterion, as used herein, refers to a rule with one or more requirements for evaluating data stored, retrieved, determined, or processed by the accommodation management system 130. The data satisfies the criterion when it meets the one or more requirements of the rule. In an embodiment, the accommodation listing selection module 220 receives the set of constraints from goal module 210. Accommodation listing selection module 220 may initially identify the set of candidate accommodation listings which satisfy a set of minimal criteria, such as identifying all accommodation listings with an accommodation located within a threshold distance from the activity. Accommodation listing selection 220 may filter the identified set of candidate accommodation listings for accommodation listings with booking availability on dates which the guest user is also available. Additionally, accommodation listing selection module 220 may further filter the accommodation listings based on additional criteria, which is described in greater detail below.

Accommodation listing selection module 220 may apply availability criteria to filter the set of candidate accommodation listings. In this case, accommodation listing selection module 220 may filter the set of candidate accommodation listings based on the number of consecutive days both the guest user is available to book the accommodation listing and the accommodation listing is available to be booked. For example, accommodation listing selection module 220 may remove accommodation listings which are only available for one night. Accommodation listing selection module 220 may first identify one or more dates from the guest user's calendar data and/or the subset of time constraint by applying a set of criteria using the guest user's calendar data before searching for accommodation listings with availability on the identified dates. A date may satisfy a criterion if the date meets requirements of the criterion regarding the guest user's availability (e.g. is the guest user available on the date), the activity (e.g. can the activity be completed on the date), or the date (e.g. is the date a holiday). For example, accommodation listing selection module may require that a guest user is also available on the date preceding a given date in order to consider the given date when filtering the set of candidate accommodation listings. After identifying the one or more dates, accommodation listing selection model may filter the set of candidate accommodation listings by determining whether the candidate accommodation listings are available for booking on at least one of the identified dates. Accommodation listing selection module 220 may allow users to adjust the criteria for dates to be considered when filtering candidate accommodation listings. Additionally, accommodation listing selection module 220 may determine the exact availability criteria based on one or more additional factors, such as the type of relevant activity (e.g. does the activity require several days?).

Accommodation listing selection module 220 may apply mode of transportation criteria to filter the set of candidate accommodation listings. In this case, accommodation listing selection module 220 may determine one or more modes of transportation corresponding to each candidate accommodation listing, as described above in relation to recommendation module 230. Examples of mode of transportation criteria applied by the accommodation listing model include a minimum number of associated modes of transportation, a required mode of transportation (e.g. bus), a preferred mode of transportation, distance to one or more modes of transportation, etc.

In some embodiments, accommodation management system 130 allows a guest user to set and adjust the criteria described above. For example, the guest user may set a required number of available days, or a required mode of transportation, for an accommodation listing to remain in the filtered set of candidate accommodation listings. Accommodation management system 130 may provide one or more interfaces or interface elements for display on a guest user's client device (e.g. guest client device 120) usable by a guest user to set and adjust filter criteria setting.

In an embodiment, accommodation listing selection module 220 provides references to the filtered accommodation listings (e.g. unique listing identifiers stored in accommodation listing data store 240) to the recommendation module 230. Accommodation listing selection module may limit the number of number of candidate accommodation listings provided to the recommendation module 230 in order to limit the number of accommodation listings which are ranked or displayed on a client device, as described in the following section.

Recommending Accommodation Listings

In various embodiments, recommendation module 230 ranks a set of candidate accommodation listings based on a set of ranking criteria. In an embodiment, recommendation module 230 receives references to the set of candidate accommodation listings from the accommodation listing selection module 220. Based on the ranking, recommendation module 230 generates and sends a recommendation including a description of one or more of the ranked accommodation listings to the client device of the guest user corresponding to the travel activity goal. For example, recommendation module 230 may include descriptions of only the highest ranked accommodation listing in the recommendation, the top 10 ranked accommodation listings, a subset of ranked accommodation listings based on certain criteria (e.g. geographic proximity), or all of the ranked accommodation listings. The recommendation as displayed by the client device may additionally include interactable objects configured to facilitate booking one or more of the displayed accommodation listings by accommodation management system 130. The term interactable object, as used herein, refers to virtual object displayed on an interface which a user can interact with through means provided by a system or device order to execute functionality provided by the system.

FIG. 3A illustrates one embodiment of a user interface 300 for selecting a preferred criterion for ranking accommodation listings. As described above in relation to recommendation module 230, the ranking may be determined based on one or more modes of transportation corresponding to each accommodation listing. Recommendation module 230 provides for display the interface 300 on a guest user's client device (e.g. guest client device 120). The interface 300 includes a recommended list of ranked accommodation listings and a drop-down menu for selecting a preferred ranking criterion, most of which relate to preferred modes of transportation (i.e. bus, train, subway, and taxi). The drop-down menu displays selectable descriptions of a metric relevant to the criterion's rules, such as a mode of transportation. The term preferred mode of transportation, as used herein, refers to the mode of transportation which a guest user desires to use for accessing an accommodation and/or a travel activity. In particular, the bus option is used as a default mode of transportation ranking criterion and is currently selected on interface 300, as indicated by the black dot. The guest user may select another ranking criterion (e.g. a preferred mode of transportation ranking criterion) by clicking, touching, or otherwise selecting a ranking criterion from the drop-down menu, based on the interaction capabilities of the client device. Recommendation module 230 ranks the candidate accommodation listings based on the currently selected ranking criteria and generates the recommendation including descriptions of the candidate accommodations based on the ranking. Additionally, recommendation module 230 includes information relating to the ranking criterion used to perform the ranking in the recommendation corresponding to each accommodation listing, and provides a result of using the criterion to evaluate the accommodation listing to determine the rank. For example, interface 300 includes the proximity of each accommodation listing to a bus stop, with the highest ranked accommodation listing being 0.1 miles away.

In some embodiments, recommendation module 230 updates the interface 300 in response to the guest user selecting a new preferred mode of transportation. In particular, recommendation module 230 may re-determine the ranking based on the new preferred mode of transportation. In various embodiments, recommendation module 230 determines the ranking based on multiple modes of transportation. Additionally, the drop-down menu may allow the guest user to select multiple preferred modes of transportation, rank the modes of transportation, or otherwise adjust the modes of transportation used to determine the ranking. In an embodiment, recommendation module 230 updates the mode of transportation options included for selection in the drop-down menu based on the modes of transportation corresponding to the candidate accommodation listings indicated by the received references. In this case, more unusual transportation modes, such as a boat or helicopter, may be included if some of the candidate accommodation listings correspond to these modes.

Recommendation module 230 may rank the candidate accommodation listings based on past user activity on accommodation management system 130 or a third-party system. For example, recommendation module 230 may rank accommodation listings higher that are similar to accommodation listings the guest user has previously booked. As another example, recommendation module 230 may rank accommodation listings higher that are similar to accommodation listings the guest user has previously viewed. Recommendation module 230 may provide for display to a client device an interface including accommodation listings ranked based on user activity. For example, recommendation module 230 may provide an interface with a "recommended for you" tab which directs a guest user to a recommendation including accommodation listings ranked based on the guest user's past user activity. For example, the "recommended for you" tab in the drop-down menu depicted in FIG. 3A. Accommodation management system 130 may access user activity data from third-party systems describing a guest user's travel habits, such as mode of transportation habits (e.g. ride-share applications, navigation applications on the guest user's client device, etc.). In this case, recommendation module 230 may use the data describing the user's travel habits to rank the candidate accommodation listings, such as by weighting modes of transportation a guest user has frequently used more highly in the ranking.

In the same or different embodiments, recommendation module 230 may have access to data describing a user's interests, which may be provided by a third-party system (e.g. a social network) or included with the user profile on the accommodation management system 130. In this case, recommendation module 230 may rank the accommodation listings based on the particular activity the accommodation listing is being recommended for. For example, if the general travel activity is basketball games, and one accommodation is recommended for a Los Angeles Lakers game while another accommodation is recommended for a Los Angeles Clippers game, recommendation module 230 may determine the user is interested in Lakers games and rank the relevant accommodation more highly.

In an embodiment, recommendation module 230 trains and uses a machine learned model for ranking accommodation listings (i.e. a ranking model). Recommendation module 230 may input various data describing the candidate accommodation listings, selected or inferred user preferences (e.g. preferred mode of transportation or past user searches) to the ranking model, travel activity goal constraints, other data related to the guest user, or some combination thereof. Recommendation module 230 may receive as output for the ranking model one or more scores for each accommodation listing represented in the input indicating the likelihood that the guest user would book the accommodation listing. Based on the scores output by the ranking model, recommendation module 230 may determine the rankings for the candidate accommodation listings. Recommendation module 230 may re-rank the candidate accommodation listings displayed in a recommendation automatically or in response to user input.

FIG. 3B illustrates one embodiment of a user interface 310 for providing a recommendation to a guest user that includes groups of accommodation listings. As described above in relation to recommendation module 230, recommendation module 230 may determine one or more groups of accommodation listings from the set of candidate accommodation listings based on the travel activity goal. In particular, recommendation module 230 may determine groups of accommodation listings that correspond to particular trips for experiencing the relevant travel activity goal (e.g. seeing a specific basketball game on a specific date, visiting a specific place on specific dates, etc.). As such, recommendation module 230 may group accommodation listings based on the geographic position of each accommodations and the availability of the accommodation listing. Furthermore, recommendation module 230 may rank the groups of accommodation listings based on any data corresponding to the accommodation listings, the travel activity goal constraints, the user activity, corresponding modes of transportation, or some combination thereof. Furthermore, recommendation module 230 may determine how the descriptions of the groups of accommodation listings are displayed based on the group rankings (e.g. displayed sequentially based on rank).

In the exemplary case depicted in FIG. 3B, interface 310 illustrates a recommendation which includes a set of accommodation listing groups corresponding to professional basketball games in California during the Winter season. For example, the guest user may have provided the travel activity goal "I want to see professional basketball games in California during the Winter." Recommendation module 230 provides this recommendation to the guest user's client device for display on the interface 310, which includes an expandable drop-down menu for each group of accommodation listings. The drop-down menus corresponding to the top-most and bottom-most accommodation listing groups are currently expanded. The top-most accommodation listing group includes descriptions of a set of ranked accommodation listings for a one-day trip to see a basketball game in Los Angeles on a particular date (December 13$^{th}$). Similarly, the bottom-most accommodation listing group includes descriptions of a list of accommodation listings for a two-day trip, and in particular includes a description of an accommodation listing for each day. In other examples, the drop-down menu may include descriptions of several ranked accommodation listings corresponding to each date. Recommendation module 230 may update interface 310 in response to interactions by the guest user with one or more displayed accommodation listings.

In some embodiments, recommendation module 230 stores the data corresponding to the generated recommendation in a data store included with accommodation management system 130 (e.g. the travel goal, the travel goal constraints, references to the candidate accommodation listings, etc.). In this case, recommendation module 230 may simultaneously store multiple recommendations for a guest user, and furthermore may provide functionality for a guest user to view, edit, and otherwise interact with their stored recommendations.

In an embodiment, Accommodation management system 130 may periodically re-determine the rankings of the candidate accommodation listings corresponding to a recommendation. Re-determining the rankings may include goal module 210 re-determining the set of constraints corresponding to the travel activity goal, accommodation listing selection module 220 re-determining the set of candidate accommodation listings, recommendation module 230 re-determining the rankings, and any combination thereof. Accommodation management system 130 may additionally re-determine the rankings in response to receiving updates to any of the data used to determine the previous rankings, such as updates to the accommodation listing availability data, updates to the user calendar data, updates to the user activity data, etc. Accommodation management system 130 may provide one or more interfaces for display on a guest user's client device which allow the guest user to adjust or manipulate any of the parameters used in determining a recommendation. For example, recommendation module 230 may provide an "edit" interface for each recommendation, which allows the guest user to directly manipulate the travel activity goal constraints. Furthermore, accommodation management system 130 may perform the re-ranking process described above automatically in response to manipulation of the parameters by the guest user.

Recommendation module 230 may periodically rank the stored recommendations and send a recommendation to the guest user based on the overall ranking of the recommendations. For example, a guest user may have five saved recommendations each corresponding to different travel goals, where the recommendation module has determined that guest user will not feasibly be able to accomplish all of the travel goals given the corresponding constrains. As such, recommendation module 230 may determine a ranking of the recommendations and provide the most highly ranked recommendation to the user.

Accommodation management system 130 may provide functionality in each recommendation to allow a guest user to book one or more of the recommended accommodation listings. Furthermore, accommodation management system 130 may allow the guest user to adjust the travel activity goal, the constraints, their preferences, or any other data used to determine the recommendation in order to allow the guest user to select the most optimal accommodation listings for a trip.

Computing Machine Architecture

Figure 4:
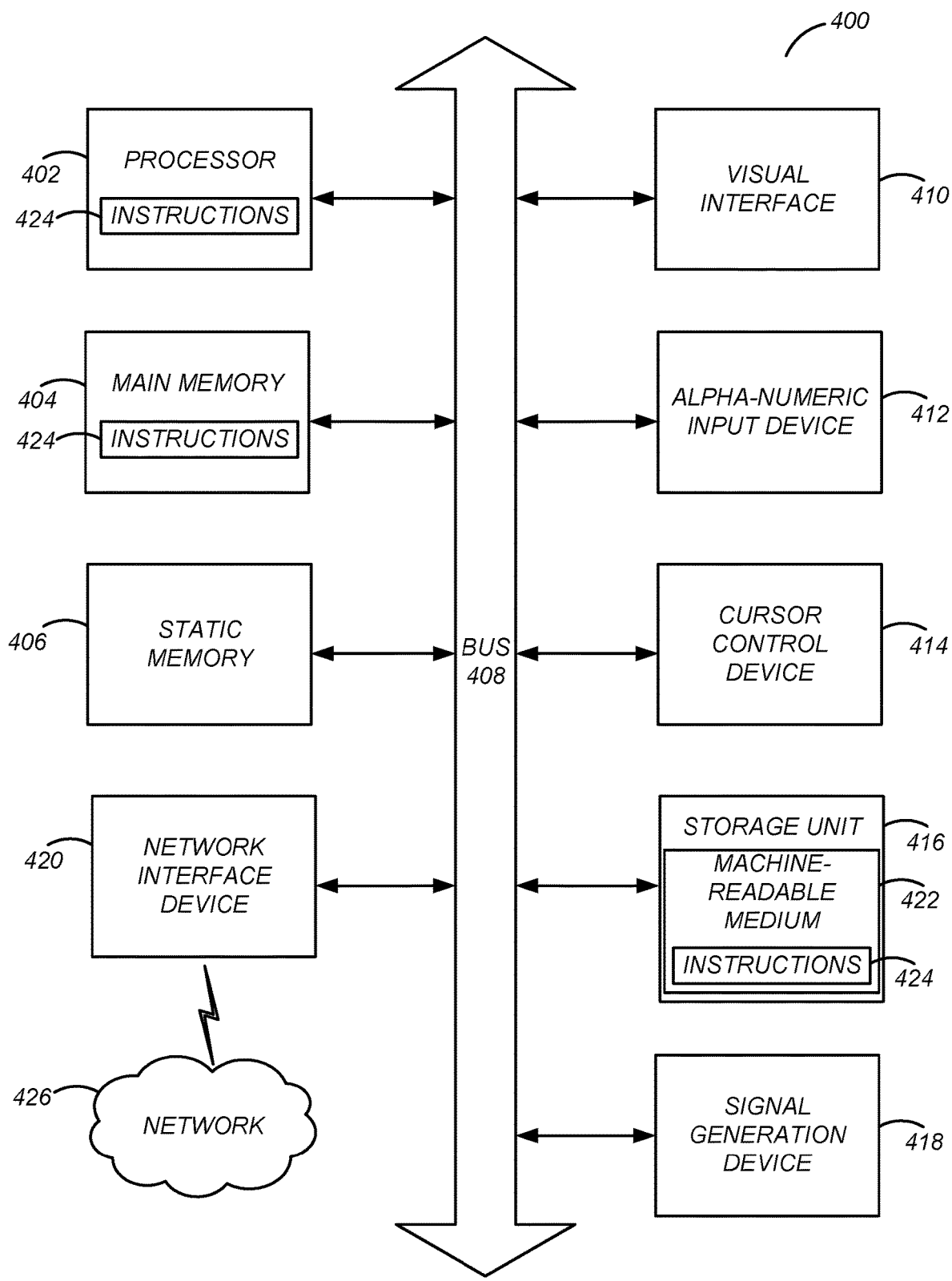
FIG. 4 illustrates one embodiment of a block diagram illustrating components of an example machine able to read instructions from a machine-readable medium and execute them in a processor (or controller).

FIG. (FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alpha-numeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Recommending Accommodation Listings for Travel Activity Goal

Figure 5:
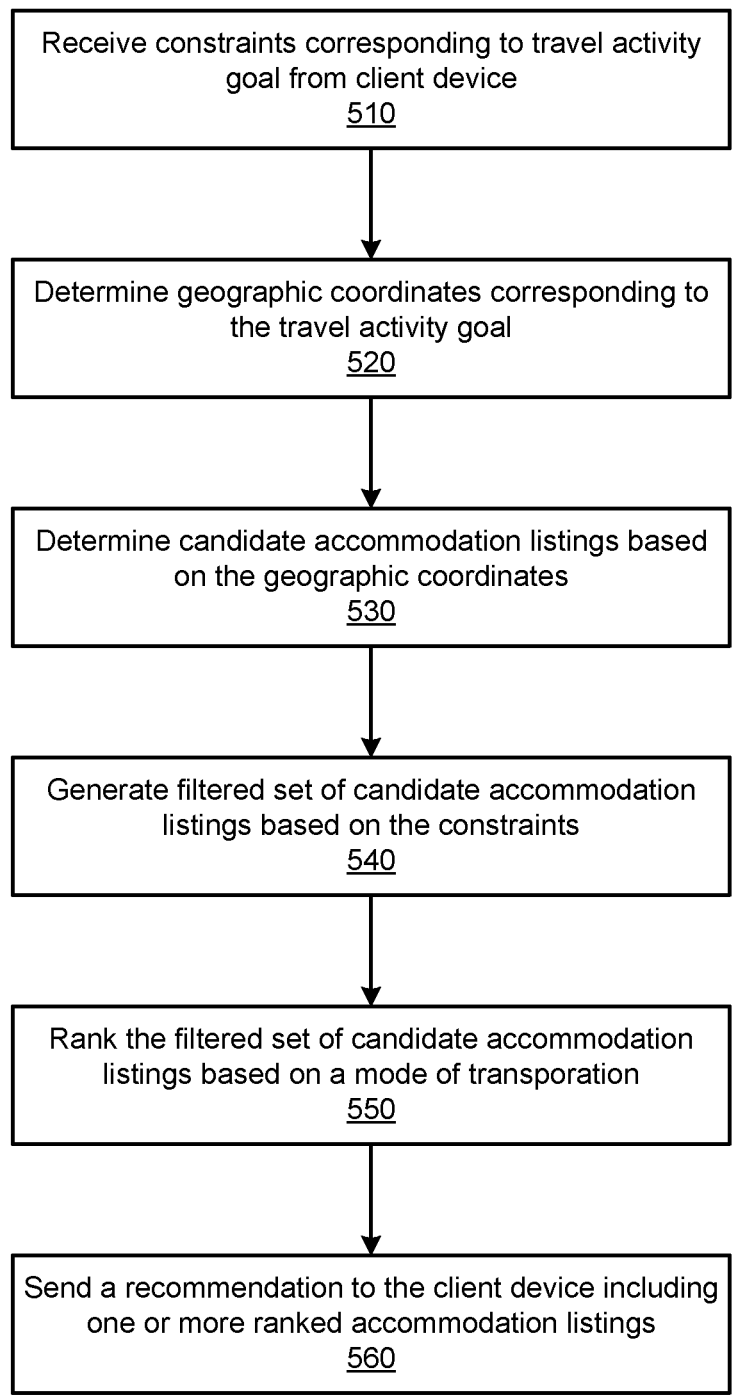
FIG. 5 illustrates one embodiment of a process for recommending accommodation listings which satisfy a set of constraints corresponding to a travel activity goal.

FIG. 5 illustrates one embodiment of a process 500 process for recommending accommodation listings which satisfy a set of constraints corresponding to a travel activity goal. Process 500 begins with the accommodation management system 130 receiving 510 constraints corresponding to a travel activity goal from a client device. For example, a guest user may input the constraints through a user interface on an application installed on the client device. As another example, the guest user may input a text description of the travel activity goal on the client device and goal module 210 may determine the constraints based on the text input. The received constraints may include an identifier corresponding to data describing the activity (e.g. stored in activity data store 250), an end time, and indicia of a subset of time during which the guest user is available to experience the travel activity.

Accommodation management system 130 determines 520 geographic coordinates corresponding to the travel activity included in the constrains (e.g. using a travel activity identifier). Using the geographic coordinates, accommodation management system 130 determines 530 a set of candidate accommodations based on the geographic coordinates. For example, accommodation listing selection module 220 may determine accommodation listings within a threshold distance from locations where the travel activity can be experienced. From the candidate accommodation listings, accommodation management system 130 generates 540 a filtered set of candidate accommodation listings using the constraints. For example, accommodation listing selection module 220 may remove accommodation listings which do not have available bookings when the guest user is available. Accommodation management system 130 ranks 550 the filtered set of candidate accommodation listings based on a mode of transportation for accessing the travel activity. For example, recommendation module 230 may rank accommodation listings which are close to bus stops higher relative to other accommodation listings. Finally, accommodation management system 130 sends 560 a recommendation to the client device of the guest user corresponding to the travel activity which includes one or more of the ranked accommodation listings. For example, the client device may display the recommendation on interface 310.

Other entities may perform some or all the steps of the process 500 in other embodiments. Likewise, embodiments may include different and/or additional steps, or perform the steps in different orders.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for recommending accommodation listings to a guest user for experiencing a travel goal through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, by an accommodation management system, from a client device of a user, a travel activity goal indicating a plurality of activities, each activity of the plurality of activities corresponding to a respective geographic region of a plurality of geographic regions;
   determining a corresponding date for each activity of the plurality of activities;
   determining for each activity of the plurality of activities, by the accommodation management system, a plurality of candidate accommodation listings based on geographic coordinates corresponding to the respective geographic region and the corresponding date for the activity;
   ranking the plurality of candidate accommodation listings for each activity based on a selected mode of accessing the activity and one or more scores for each accommodation listing indicating a likelihood that the user would book the accommodation listing, wherein the one or more scores are generated by a machine learned model configured to output the one or more scores based on at least one of data describing the candidate accommodation listings, selected or inferred user preferences, or travel activity goal constraints; and
   causing for display, on the client device, a recommendation for one or more accommodation listings for each activity of the plurality of activities from the candidate accommodation listings based on the ranking, wherein the recommendation for the one or more accommodation listings are grouped by respective activity.

2. The method of claim 1, wherein the corresponding date for a first activity of the plurality of activities is a date range and further comprising:
   determining that a single accommodation is not available for the date range of the first activity; and
   creating a group of more than one candidate accommodation that satisfies the date range for the first activity.

3. The method of claim 1, wherein determining for each activity of the plurality of activities, a plurality of candidate accommodation listings is further based on a set of data describing dates on which the user of the client device is available.

4. The method of claim 1, wherein each candidate accommodation listing of the plurality of candidate accommodation listings is located at a geographic coordinate in a respective geographic region.

5. The method of claim 1, wherein each candidate accommodation listing in the plurality of candidate accommodation listings is available during a time range corresponding to the date for the activity.

6. The method of claim 1, wherein ranking the plurality candidate accommodation listings is further based on the user's accommodation preferences based on prior booking history in the accommodation management system.

7. The method of claim 6, wherein ranking the plurality of candidate accommodation listings is further based on activity data from third-party systems describing the user's travel habit.

8. The method of claim 1, wherein causing for display, on the client device, further comprises adding one or more available modes for accessing the activity corresponding to the candidate accommodation listing to the recommendation.

9. The method of claim 8, wherein ranking the plurality of candidate accommodation listings further comprises:
  displaying, by the accommodation management system, an interface on the client device, the interface including an interactable object for selecting from a plurality of preferred modes for accessing the activity;
  receiving, by the accommodation management system, a selection of a preferred mode of accessing the activity by a user of the client device through an interaction with the interactable object; and
  wherein the selection of the preferred mode of accessing the activity is the selected mode of accessing the activity.

10. The method of claim 1, further comprising:
  receiving, by the accommodation management system, text input, the text input including a description of a first activity of the plurality of activities;
  inputting the text input into a machine learned model configured to determine a set of constraints;
  receiving one or more constraints from the plurality of constraints as output from the machine learned model; and
  before ranking the plurality of candidate accommodation listings for each activity, filtering the plurality of candidate accommodation listings by applying the one or more constraints output by the machine learning model.

11. The method of claim 10, wherein receiving one or more constraints from the plurality of constraints as output from the machine learned model further comprises:
  determining one or more words corresponding to one or more constraint types;
  determining, by the accommodation management system, a set of data describing interactions by the user of the client device with the accommodation management system;
  for each constraint category:
    comparing the one or more words corresponding to the constraint type to the set of data; and
    determining, based on the comparison, a constraint for the constraint type;
  outputting the determined constraints for the one or more constraint categories.

12. The method of claim 1, further comprising:
  storing, by the accommodation management system, the recommendation with a plurality of recommendations corresponding to the user of the client device, each recommendation of the plurality of recommendations corresponding to one of a plurality of activity identifiers;
  ranking, by the accommodation management system, the plurality of recommendations; and
  sending for display, to the client device, a second recommendation for a second accommodation listing from the plurality of recommendations based on the ranking of the plurality of recommendations.

13. The method of claim 1, further comprising:
  receiving, by the accommodation management system, an update to an availability of a candidate accommodation listing from the plurality of candidate accommodation listings;
  reranking the plurality of candidate accommodation listings based on the update; and
  sending for display, to the client device, a second recommendation for a second accommodation listing based on the update.

14. The method of claim 1, wherein the plurality of activities are listed in an order of the corresponding date for each activity.

15. The method of claim 14, wherein the grouped recommendation for one or more accommodation listings are displayed with each respective activity listed in the order of the corresponding date for each activity.

16. The method of claim 14, wherein each listed activity in the plurality of activities comprises an expandable drop-down menu for a respective grouped recommendation of one or more accommodation listings.

17. A system comprising:
  a non-transitory computer-readable medium comprising instructions encoded thereon; and
  one or more processors configured to execute the instructions, the instructions, when executed, causing the one or more processors to perform operations comprising:
    receiving, from a client device of a user, a travel activity goal indicating a plurality of activities, each activity of the plurality of activities corresponding to a respective geographic region of a plurality of geographic regions;
    determining a corresponding date for each activity of the plurality of activities;
    determining for each activity of the plurality of activities, a plurality of candidate accommodation listings based on geographic coordinates corresponding to the respective geographic region and the corresponding date for the activity;
    ranking the plurality of candidate accommodation listings for each activity based on a selected mode of accessing the activity and one or more scores for each accommodation listing indicating a likelihood that the user would book the accommodation listing, wherein the one or more scores are generated by a machine learned model configured to output the one or more scores based on at least one of data describing the candidate accommodation listings, selected or inferred user preferences, or travel activity goal constraints; and
    causing for display, on the client device, a recommendation for one or more accommodation listings for each activity of the plurality of activities from the candidate accommodation listings based on the ranking, wherein the recommendation for the one or more accommodation listings are grouped by respective activity.

18. A non-transitory machine readable medium configured to store instructions, the instructions when executed by a processor cause the processor to perform operations, the instructions comprising instructions to perform operations comprising:
  receiving, from a client device of a user, a travel activity goal indicating a plurality of activities, each activity of the plurality of activities corresponding to a respective geographic region of a plurality of geographic regions;
  determining a corresponding date for each activity of the plurality of activities;
  determining for each activity of the plurality of activities, a plurality of candidate accommodation listings based on geographic coordinates corresponding to the respective geographic region and the corresponding date for the activity;
  ranking the plurality of candidate accommodation listings for each activity based on a selected mode of accessing the activity and one or more scores for each accommodation listing indicating a likelihood that the user would book the accommodation listing, wherein the one or more scores are generated by a machine learned model configured to output the one or more scores based on at least one of data describing the candidate accommodation listings, selected or inferred user preferences, or travel activity goal constraints; and causing for display, on the client device, a recommendation for one or more accommodation listings for each activity of the plurality of activities from the candidate accommodation listings based on the ranking, wherein the recommendation for the one or more accommodation listings are grouped by respective activity.

\* \* \* \* \*